United States Patent [19]
Onuki

[11] 3,820,308
[45] June 28, 1974

[54] STERILIZING AIR FILTER WITH FORMATION OF WET, OBEAGINOUS AND DURABLE STERILIZING COATING OF FILTER BODY

[76] Inventor: Michiko Onuki, 688 Nishiya-cho, Hodogaya-ku, Yokohama, Japan

[22] Filed: Nov. 10, 1971

[21] Appl. No.: 197,723

[52] U.S. Cl.............................. 55/279, 21/53, 21/58, 21/74, 55/524
[51] Int. Cl........................................... B01d 31/00
[58] Field of Search............ 55/279, 524; 21/74, 53, 21/58; 424/316, 319

[56] References Cited
UNITED STATES PATENTS

| | | | |
|---|---|---|---|
| 2,347,031 | 4/1944 | Cupery | 55/524 |
| 2,717,850 | 9/1955 | Schmitz | 424/319 |
| 3,017,239 | 1/1962 | Rodman | 55/279 |
| 3,101,709 | 8/1963 | Grunewaelder | 55/522 |
| 3,116,969 | 1/1964 | Coleman, Jr. | 55/279 |
| 3,626,002 | 12/1971 | Daniels et al. | 424/319 |

*Primary Examiner*—Bernard Nozick
*Attorney, Agent, or Firm*—Robert E. Burns; Emmanuel J. Lobato; Bruce L. Adams

[57] ABSTRACT

A sterilizing air filter is disclosed wherein the filter elements are coated with a wet, oleaginous durable sterilizing material. The coating material comprises a mixture of amphoteric sterilizing agents and quaternary ammonium salt sterilizing agents incorporated in a paraffin hydrocarbon carrier system.

4 Claims, 3 Drawing Figures

STERILIZING AIR FILTER WITH FORMATION OF WET, OBEAGINOUS AND DURABLE STERILIZING COATING OF FILTER BODY

FIELD OF THE INVENTION

This invention related to a sterilizing air filter, comprising applying a strongly sterilizing agent to a filter body of excellent air-passable properties and a dust-holding structure so that the filter body can be impregrated with said agent satisfactorily to form a wet, oleaginous sterilizing coating thereon. When the surface of the filter body is contaminated or its inherent effect is weakened, it can be washed with water to remove all contamination and a fresh sterilizing coating can be formed again for reuse of the filter body, said filter body being designed to fit in the required place easily.

BACKGROUND OF THE INVENTION

Most conventional air filter of known systems to catch dust alone. In such cases, even when the dust can be removed, it is impossible to sterilize the bacteria adhering to the dust so that such bacteria are sure to grow on the air filter until they enter the interior of the air filter and are spread into the open air from the opposite side of the air filter, thus presenting the air filter itself as if it were a medium of bacterial propagation.

To make the matter worse, fungi are apt to grow on the air filter of this kind.

Along with further progress of research, there appeared a sterilizing filter capable of catching not only the dust but also capable of sterilizing bacteria adhering to dust which is caught on the air filter.

However such sterilizing power is liable to be weakened or disappear entirely in an extremely short period of time and moreover no sufficient pathogenic effect can be anticipated against a wide spectrum of organisms.

At the same time, such a filter body cannot be used repeatedly because it is designed to be disposable.

Now, the applicant of the present invention has discovered a sterilizing air filter possessed of an extensively sterilizing and durable power over a wide range of various kinds of bacteria and capable of being placed freely where required due to the fact that it has a wet, oleaginous and durable sterilizing coating on a filter body of excellent air-passable properties and dust-holding efficiency. When the sterilizing effect of such filter body is weakened with its use, it can be washed with water to remove its contamination and to regenerate a fresh sterilizing coating again there on for its repeated use. The filters of this invention show a long-last sterilizing effect for a longer period of time than previously possible.

BRIEF SUMMARY OF THE INVENTION

The first object of the present invention is to obtain a sterilizing air filter having a strongly sterilizing effect against various pathogenic bacteria such as gram-positive and gram-negative bacteria and tubercle bacilli.

The second object of the present invention is to obtain a sterilizing air filter capable of maintaining a sterilizing effect for an extremely long period of time.

The third object of the present invention is to obtain a sterilizing air filter of very highly dustholding properties.

The fourth object of the present invention is to obtain a sterilizing air filter such that when its sterilizing effect is weakened after its use, it is washed with water or hose-washed to remove its contamination, and thus regenerating it and forming or presenting a fresh sterilizing coating on the surface of the filter body again and again.

The fifth object of the present invention is to obtain a sterilizing air filter such that it is capable of catching dust floating in the open air and perfectly killing bacteria adhering to the dust thus caught, thereby satisfactorily purifying air passing through the air filter.

As the first feature of the present invention the constitution of a sterilizing air filter to achieve all the above-mentioned objects must be understood in the manner that the main ingredient of this sterilizing air filter is composed of amphoteric active sterilizing agents, to which are added a hydrocarbon of the paraffin system, a wetting agent and a solvent and the resulting active sterilizing agent is applied to the surface of a filter body having air-passable and dust-holding properties for its impregnation, there by forming a non-dry, wet-type and durable sterilizing coating on the filter body.

As the second feature of the present invention, the constitution of a sterilizing air filter must be understood in the manner that either or both amphoteric active sterilizing agents or positive or cationic sterilizing agents are selected to which are added a hydrocarbon of the paraffin system, a wetting agent and a solvent, and the resulting active sterilizing agent thus obtained is applied to the surface of a filter body having air-passable and dust-holding properties for its impregnation, thereby forming a non-dry, wet-type and durable sterilizing coating on the filter body.

Figure 1:
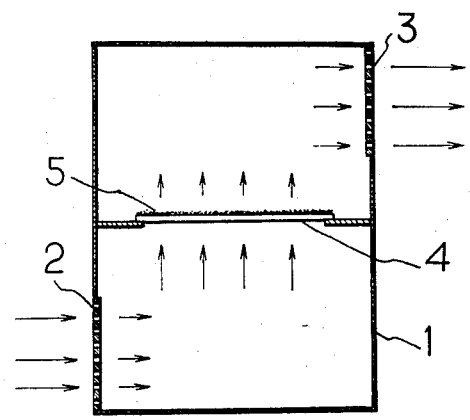
FIG. 1 is a schematic view showing an embodiment of an air filter having a durable sterilizing effect according to the present invention.

DETAILED DESCRIPTION OF THE INVENTION:

The invention will be explained in detail hereinafter.

1. Firstly the invention will be explained with reference to the active sterilizing agent being a mixture of an amphoteric active sterilizing agent and a positive, cationic active sterilizing agent.

As an amphoteric active sterilizing agent, polyoctyl or higher polyaminoethylene glycine of glycine type of the polyaminomonocarboxylic acid system is used having the following general formulas.

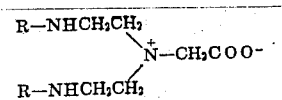

(R represents a $C_8$~$C_{18}$ alkyl group.)

or $$R - (NHCH_2CH_2)_n NH^+CH_2COOO^-$$

(R represents a $C_8$~$C_{18}$ alkyl group $n = 1$~$3$) or

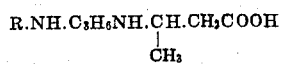

in the form of a compound of the alkylbetaine system having the above-mentioned general formulas.

R represents a $C_8$~$C_{18}$ alkyl group.

For example, the above-suggested compound is selected from the class consisting of dodecyldimethyl betaine, dodecylmethylbenzyl betaine and cetyldimethyl betaine.

As a positive and active sterilizing agent, a quarternary ammonium salt having the following general formula is used

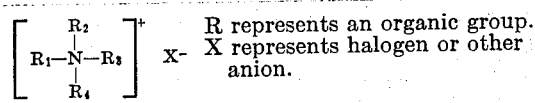

R represents an organic group.
X represents halogen or other anion.

In this case, innumerable compounds will be obtained by changing kinds of R and X and their combinations. Usually a suitable compound will be selected from the group consisting of alkyldimethylbenzyl ammonium salt, alkyltrimethyl ammonium salt, benzethoniumchloride (namely t-octylphenoxyethoxyethyl dimethyl benzyl ammonium chloride), methylbenzethonium chloride, alkylpyrizinium halide, alkylbenzyl trimethyl ammonium chloride and N-(Acylcholaminohormin) pyrizinium chloride.

EXAMPLES

1. Following is an example of a composition showing the main ingredients in the form of a mixture composed of an amphoteric active sterilizing agent and a quaternary active sterilizing agent.

| | CONTENT |
|---|---|
| Benzalconium chloride | 0.40% |
| Polyoctylpolyaminoethyl glycine | 0.27% |
| Ether | 0.18% |
| Sodium chloride | 0.06% |
| Polyethylene glycol (400) | 10.00% |
| Fluid paraffin | 10.00% |
| Methylalcohol | 10.00% |
| Chlorocen | 69.09% |
| Total: | 100.00% |

2. In the case of using an amphoteric active sterilizing agent only, polyoctylpolyaminoethyl glycine of the glycine type of the polyamino monocarboxylic acid system will be used as having the following general formulas.
$R - (NHCH_2 CH_2)_n NH^+CH_2COO^-$

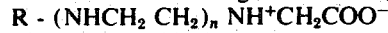
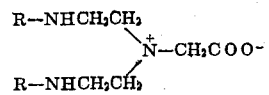

(R represents a $C_8$~$C_{18}$ alkyl group. $n = 1$~$3$) or a compound of the alkyl betaine type may also be used as having following general formula.

These can be selected from the group consisting of dodecyldimethyl betaine, dodecylmethylbenzyl betaine and cetyldimethyl betaine.

3. Following is an example of a sterilizing agent as a main ingredient composed of an amphoteric active sterilizing agent only

| | Content |
|---|---|
| Polyoctylpolyaminoethyl glycine | 0.67% |
| Ether | 0.18% |
| Sodium chloride | 0.06% |
| Polyethylene glycol | 10.00% |
| Fluid paraffin | 10.00% |
| Methyl alcohol | 10.00% |
| Chlorocen | 69.09% |
| Total: | 100.00% |

In the case of using a positive and active sterilizing agent, a quarternary ammonium salt will be used as having the following general formula.

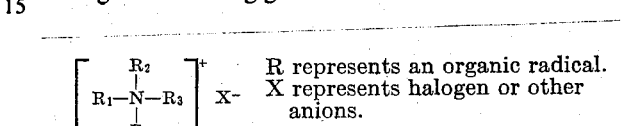

R represents an organic radical.
X represents halogen or other anions.

Namely such a compound for use can be selected from the group consisting of alkyldimethylbenzyl ammonium chloride, alkyltrimethyl ammonium halide, benzonium chloride, alkylpyrizinium halide, alkylbenzyltrimethyl ammonium chloride, and N-(acylcholamino hormin) pyrizinium chloride.

Following are two examples of a sterilizing agent having a positive and active sterilizing agent as its main ingredient.

| | Content |
|---|---|
| 4) Benzalconium chloride | 0.40% |
| Polyethylene glycol | 10.00% |
| Fluid paraffin | 10.00% |
| Methyl alcohol | 10.00% |
| Chlorocen | 69.60% |
| Total: | 100.00% |
| 5) Benzethonium chloride | 0.40% |
| Polyethlene glycol | 10.00% |
| Fluid paraffin | 10.00% |
| Methyl alcohol | 10.00% |
| Chlorocen | 69.60% |
| Total: | 100.00% |

All the active sterilizing agents obtained by the method of the present invention are of a non-dry and wet oleagenous type and show an excellent effect against bacteria and fungi a long lasting sterilizing effect which may vary depending on the kind of bacteria.

The filter body to be impregnated with the above-mentioned sterilizing agent compositions will be explained with reference to polyurethane foams for use as an embodiment of the present invention.

This filter body consists of polyurethane foam of a flexible ester type forming a reticular shape and perfectly opened fibers and cells.

It is characterized by the fact that it shows a lattice structure consisting of three dimensional (solid) twisted fibrous elements there by ensuring a definite rate 97 percent of an air area and a very high degree of permeability.

This filter body shows extremely low resistance to air flow, namely, it does not disturb air flow.

This foam material has a high degree of particle-collecting properties which are entirely due to a large degree of internal spacing of twisted fibrous constitution and of air area, thus permitting free flow and filter of air.

It is suitable for use as a filter body and its surface area for collection of particles can be increased by frilling it.

A filter medium is considered permanent for use once has been treated according to this invention. It can be regenerated by washing with water-or hose or-vacuum-washed.

Each cell of this foaming medium is interconnected to its surrounding cells which accounts for the free passage of air and provides a contact portion of a large surface area for impact of dust particles.

At the same time, the elasticity and strength of this filter body serves to prevent the change of its structure under ordinary conditions.

Moreover, it has excellent thermal stability namely, it can withstand temperatures up to 250° F and can be sterilized by washing in boiled water and steam.

It does not crack or fissure at minus 40°F, and cannot be affected with water, soaps or detergents. It can readily be cut to any sizes and nailed or stapled easily. In addition, joint stitching coagulating adhesion, lamination, taping, grommeting and heatsealing are also available. About 97 percent of the total volume of this foaming body is either air or air area it shows a highly dust-collecting effect.

In order to ensure the required sterilizing air filter effect, this polyurethane foam is immersed in a sterilizing agent composition solution with a main ingredient in the form of a sterilizing surface active agent according to the above-mentioned compositions so that a panel of sterilizing polyurethane foam having an air filter effect and a durable and strong sterilizing effect can be obtained.

The panel thus obtained is secured to a frame plate, which is then freely attachably and detachably disposed in the air passage of a room ventilator as a working example, thereby enabling ventilation, dust-collection and sterilization to be effected.

FIG. 1 shows a mode of use of an air filter having a sterilizing effect according to the present invention.

In the drawing, an air conditioning device is indicated at 1 provided with an air-suction inlet 2 in the lower part and an air-flow outlet 3 in the upper and opposite part, wherein there is provided a ventilating support plate 4 at right angles to said air-flow outlet and an air filter 5 according to this invention having a sterilizing effect, is mounted on said ventilating support plate for the purpose of holding dust contained in the air and sterilizing bacteria adhering to the dust thus caught.

Figure 2:
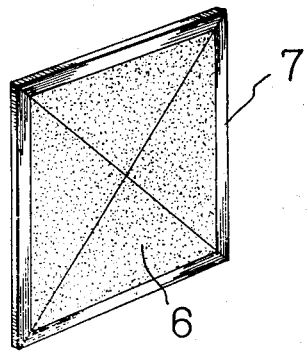
FIG. 2 is a perspective view showing an embodiment of a filter body of polyurethane foam having a durable sterilizing effect.

FIG. 2 is a perspective view of an air filter of polyurethane foam as an air-passable filter body impregnated with a sterilizing agent according to this invention wherein the polyurethane foam is indicated at 6 and a frame plate at 7 respectively.

Figure 3:
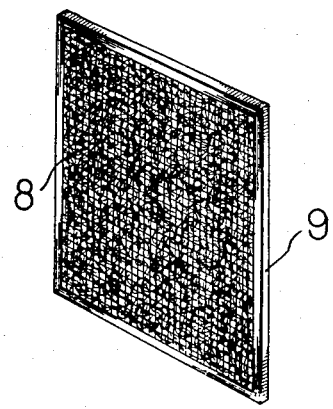
FIG. 3 is a perspective view showing an embodiment of a filter body of glass fibers having a durable sterilizing effect.

FIG. 3 shows a filter body of glass fibers wherein reference numeral 8 indicate glass fibers and reference numeral 9 indicates a frame plate.

The outstanding characteristic os this air filter having a last-long sterilizing effect is that a sterilizing agent applied to it for impregnation is a non-dry, wet-type one, polyurethane foam is flexible and all cells of the foam are perfectly interconnected to each other, thus permitting the free passage of air and providing a high degree of contact surface area for impingement of dust particles thereon and the non-dry, wet oleaginous properties of the sterilizing agent itself are very ef effective in ensuring the adhesion and precipitation of dust. In view of the above-mentioned characteristic, it is obvious that the present air filter provides such air-passable and dust-holding effect as cannot be anticipated from conventional air filters and moreover, it has a very durable sterilizing effect and a renewable washing effect well combined together.

The present air filter having such a powerful sterilizing effect develops a strong sterilizing and washing effect against gram-positive and negative bacteria and tubercle bacillc.

Another characteristic of this air filter having a durable sterilizing effect is that when dust is collected on the mesh of the filter after long use until its ventilating effect is reduced, it is contained with dust or bacteria and its sterilizing effect weakened, it has only to be washed with water or hose-washed and what is more, it can be used many times after drying it at ordinary temperature, unlike those of prior art which are not renewable and must be disposed each time.

This air filter having a sterilizing power is very easy to wash. At the same time, unlike those filters of prior art which only hold the bacteria in the state they are caught, this invention's air filter ensures that any bacteria caught are billed or sterilized in situ thus providing no danger to the operator. Moreover, even if the air filter is thrown away, there is no danger that live bacteria may be dispersed because all bacteria are found already sterilized.

As has been described hereinbefore, the present air filter having a last-long sterilizing effect which has been provided by the this invention ensures such a strong sterilizing effect and immobilization of bacteria as cannot be expected of conventional air filters.

Thus, because of its last-long sterilizing durability and excellent dust-holding effect, possibilities of its repeated uses due to easy washing, and its easy installation on an air flow passage, a ventilating site and a receiver or speaker, until its rapid effect can be enjoyed to a satisfactory extent, it can be used in hospitals, hotels, restaurants, factories, theaters and other places crowded with people insomuch that it can give a rapid air-purifying effect in a manner very beneficial to its users.

What is claimed is:

1. A regenerable air filter for removing particulate matter from air streams and sterilizing same which comprises a coated filter body, said filter body being of cellular or lattice structures, defining air passages, said structures being coated with a composition comprising a) a sterilizing agent, b) an oleaginous paraffin hydrocarbon and c) at least one wetting agent, said sterilizing agent a) being selected from the group of amphoteric and sterilizing compounds selected from the compounds having the following formulae:

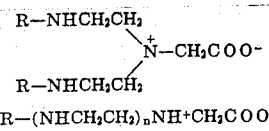

$$R-(NHCH_2CH_2)_nNH^+CH_2COO^-  \quad \text{II}$$

where R represents a $C_8 \sim C_{18}$ alkyl radical; $n = 1 \sim 3$; and cationic sterilizing compounds selected from compounds having the following formulae:

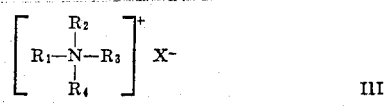

$R_1$, $R_2$, $R_3$ and $R_4$, which may be the same or different represent an organic radical; and X represents a halogen or other negative ion; and mixtures thereof.

2. An air filter according to claim 1 wherein said filter body is an open-celled polymeric foam.

3. An air filter according to claim 1 wherein said sterilizing agent is selected from the group of amphoteric sterilizing compounds consisting of dodecyldimethyl betaine, dodecylmethylbenzyl betaine, cetyldimethyl betaine, polyoctylpolyaminoethyl glycine.

4. The air filter according to claim 1 wherein said sterilizing agent is selected from the group of quaternary cationic sterilizing compounds selected from the group consisting of alkyldimethylbenzyl ammonium chloride, alkyltrimethyl ammonium halide, benzonium chloride, alkylpyrizinium halide, alkylbenzyltrimethyl ammonium chloride, N-(acylcholaminohormin) pyrizinium chloride and benzalkonium chloride, benzethonium chloride.

* * * * *